H. S. SOUTHARD, H. C. CROWELL & J. K. HALLOCK.
Joint for Oil-Well Tools.
No. 210,720. Patented Dec. 10, 1878.
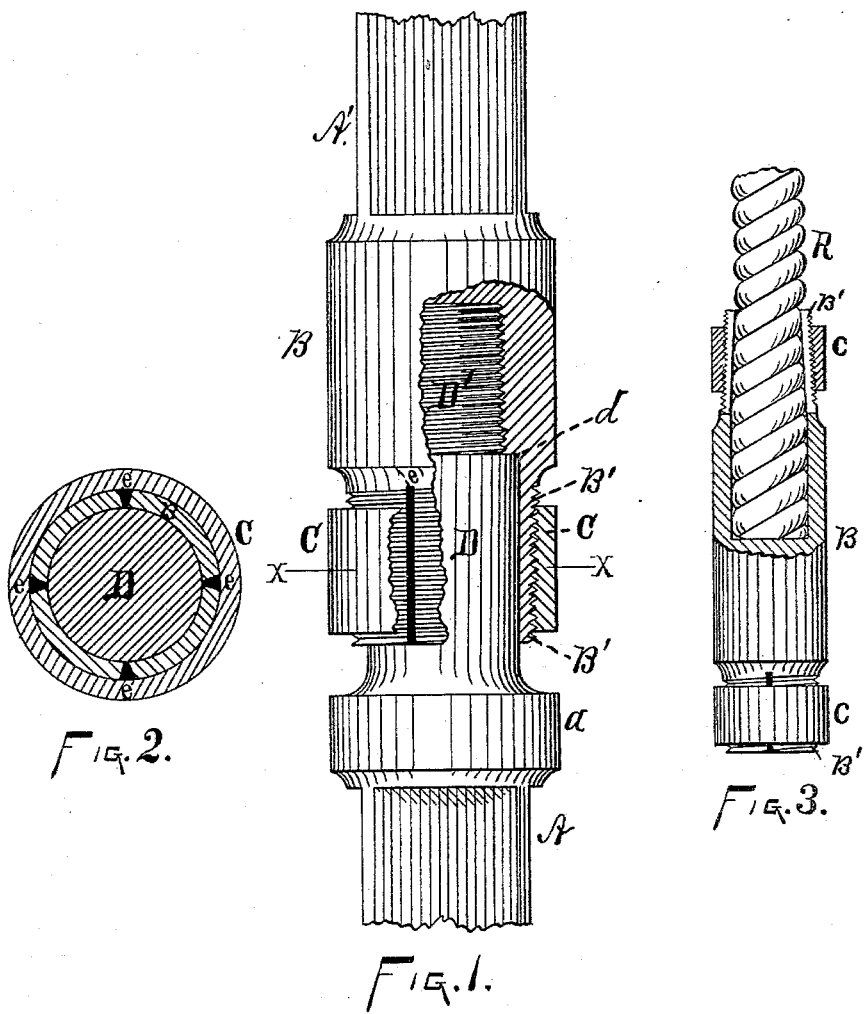

UNITED STATES PATENT OFFICE.

HENRY S. SOUTHARD, OF NORTH EAST; AND HILEN C. CROWELL AND JOHN K. HALLOCK, OF ERIE, ASSIGNORS OF ONE-HALF THEIR RIGHT TO GEORGE E. SOUTHARD, OF NORTH EAST, PENNSYLVANIA.

IMPROVEMENT IN JOINTS FOR OIL-WELL TOOLS.

Specification forming part of Letters Patent No. 210,720, dated December 10, 1878; application filed May 29, 1878.

*To all whom it may concern:*

Be it known that we, HENRY S. SOUTHARD, of North East, and HILEN C. CROWELL and JNO. K. HALLOCK, of Erie, in the county of Erie and State of Pennsylvania, have invented a new and useful Joint or Coupler for Tools Used in Drilling Oil-Wells; and we do hereby declare the following to be a full, clear, and exact description thereof.

Our invention relates to the construction of the joints or couplings for rods and tools used in drilling oil or other deep-bored wells; and it consists in changing or modifying the construction of what is commonly called the "pin-and-box joint."

Our invention will fully appear in the subjoined description.

Our device is illustrated in the accompanying drawing, as follows:

Figure 1 is an elevation view of one of our joints with parts broken away, so as to show the construction. Fig. 2 is a transverse section on line $x\,x$, Fig. 1. Fig. 3 is a view similar to Fig. 1, showing the upper coupler and rope-socket with our invention incorporated.

A A' are the rods, stems, or bits which are to be coupled. B is the box or socket, and it is shown as provided with a female screw similar to the ordinary box. The box is also provided with a tapered sleeve-like extension, B', which is provided with an external screw-thread, and it is also provided with kerfs or slots $e\,e$, of which there may be as many as desirable. C is a jam-nut or ring, which screws upon the taper sleeve B', and compresses its segmental sections together. The top of the bit or rod A is provided with a shank, D, and a pin or male screw, D', which are so fashioned as to leave a shoulder, $d$. The shank D is of less diameter near the collar $a$ than at the shoulder $d$, thus giving it a dovetail form. This taper is very slight, not being, probably, more than one-thirty-second of an inch—*i. e.*, the shank is about one-sixteenth of an inch less in diameter in the small part.

The manner of connecting the joint is as follows: The pin D' is screwed into the female screw of the box B until the shoulder $d$ is well set, so there will be no danger of giving. The jam-nut C is then screwed up until the segmental sections of the sleeve B' are firmly and rigidly set against the shank D.

The objects of this construction are as follows: With the present form of pin-and-box or screw socket—that is, the common or ordinary pin and box—the operators are compelled to screw the joint together with all the force they can put upon it (often using compound leverage) in order to prevent the joint unscrewing while in the well. This strains the iron at the base of the pin, and they often break off. The taper sleeve and jam-nut in our device act as a nut-lock. When they are well set the pin D' cannot unscrew; consequently the necessity of wrenching the pin so tight is avoided. By giving the shank a dovetail form the joint will not come apart if the pin should break. The sleeve B' also acts as a stay or brace to the joint, adding greatly to its stiffness, which of itself is sufficient to insure against the breaking of the pin. The jam-nut may be screwed up as tight as any power can do it, and yet the tension does not come when it will cause a break by the jarring of the tools in the operation of drilling.

There are several modifications that may be made in our joint, as follows: The pin D' may be dispensed with, or the pin D' may be the same size as the shank D, and thus do away with the shoulder $d$, in which case the thread in the box should be so cut as to allow the male screw to abut the pin against the top of the socket, so as to take the jar off of the screw-threads. The shank D may be without a taper when the screw-pin is used. The box may be made double, if desired, and this will be necessary in the rope-socket, as shown in Fig. 3.

The form we have shown in Fig. 1 we anticipate will be the most acceptable, as it possesses, perhaps, more elements of strength.

The essential feature of our device is the tapered screw-threaded slotted sleeve-like extension of the box B' and the jam-nut C.

We are well aware that taper sleeves and jam-nuts are old in themselves. They are used in shaft and pulley fasteners and many other places. Brad-awls have been fastened to the handles and bits in bit-stocks by the use of segmental grapplers converged by the action of a jam-nut; but we are not aware that the box of a pin-and-socket joint has been extended and tapered, and slotted and externally screw-threaded, and provided with a jam-nut, for the purposes set forth.

In Fig. 2 the slots $e$ are shown as V-shaped. This is done so that strips of wood or rubber may be laid in them to keep out water and sand from the screw-thread of the nut C.

What we claim as new is—

1. In a deep-well tool joint or coupler, the box B, made with a tapered and slotted extension, B', substantially as and for the purposes set forth.

2. In a deep-well tool joint or coupler, the tapered shank D on the part A, in combination with the clamping-extension B' of the box B on the part A', substantially as and for the purposes set forth.

In testimony whereof we, the said HENRY S. SOUTHARD, HILEN C. CROWELL, and JNO. K. HALLOCK, have hereunto set our hands.

HENRY S. SOUTHARD.
   HILEN C. CROWELL.
   JNO. K. HALLOCK.

Witnesses:
 W. S. RIBLET,
 JAS. S. MILLER.